Figures 1, 2, 3:
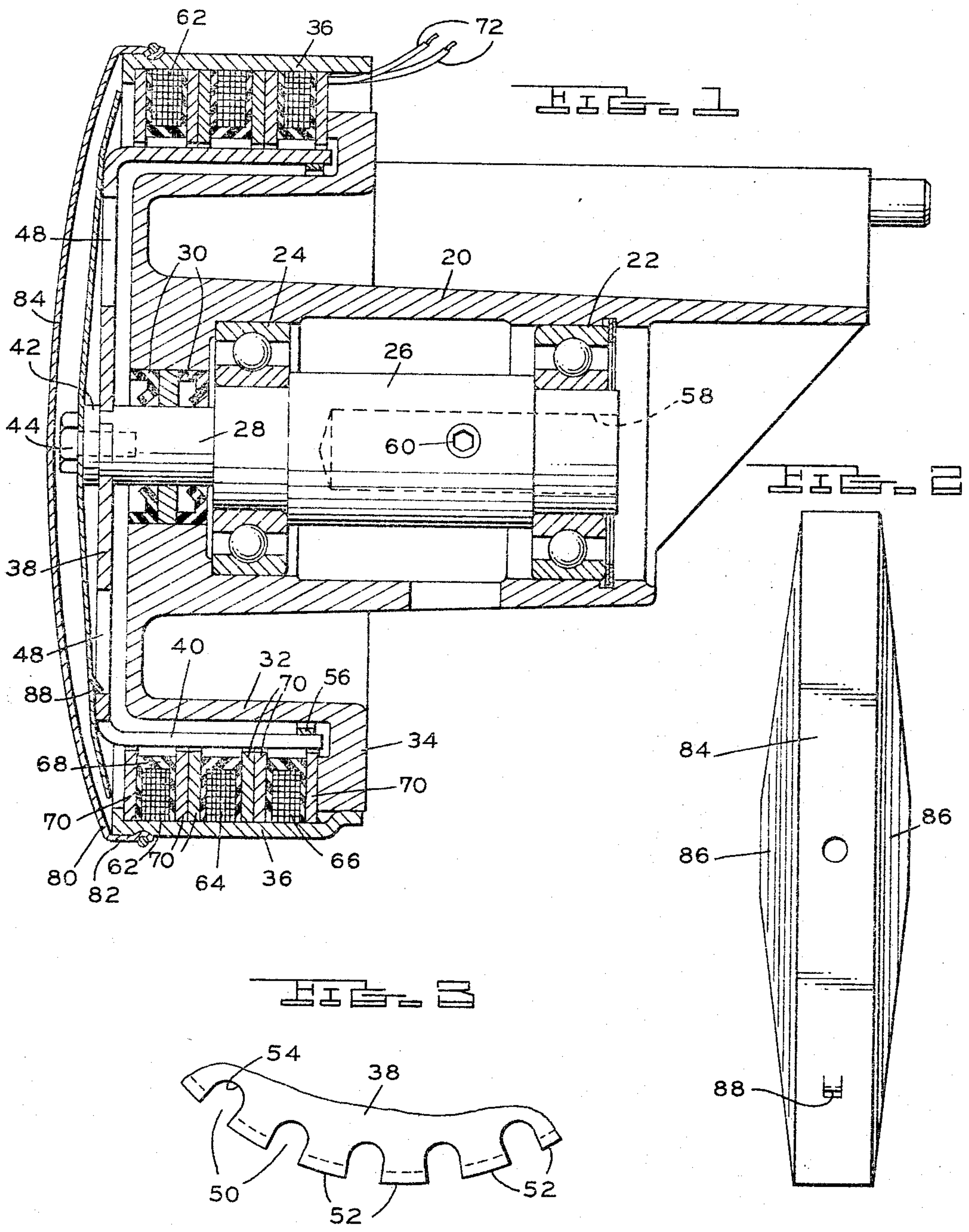

Sept. 6, 1966 R. GRAU 3,270,841

MAGNETIC PARTICLE CONTROL UNIT

Filed April 30, 1964

INVENTOR
RICHARD GRAU
BY
Barnes, Kisselle, Raisch & Choate
ATTORNEYS

United States Patent Office 3,270,841

Patented Sept. 6, 1966

3,270,841

MAGNETIC PARTICLE CONTROL UNIT

Richard Grau, Grand Rapids, Mich., assignor to Conductron Corporation, Ann Arbor, Mich., a corporation of Delaware Filed Apr. 30, 1964, Ser. No. 363,931

4 Claims. (Cl. 192—21.5)

This invention relates to a magnetic particle control unit which may be used either in the form of a clutch or a brake.

More particularly, the invention relates to what are called magnetic particle devices wherein relatively rotatable parts are closely spaced and associated therewith is a body of magnetic particles in the form of very fine material which is excited selectively by an adjacent magnetic field which can be turned on and off at will to cause the relatively rotatable parts to freeze relative to each other and thus create a braking action or a clutching action. Examples of early developments in this field are found in the patents to Rabinow, 2,575,360, dated November 20, 1951, and 2,732,921, dated January 31, 1956.

It is an object of the present invention to provide an improved structure for a friction device of the type described which has an improved resistance in the sense that it reacts more rapidly to the introduction of current to the magnet field and yet is of such a nature that it will not build up and lock due to packing of the included powder and will not heat up to the point that it is difficult to maintain a proper operating temperature. Accordingly, it is an object to provide a device which will operate at higher torques and higher speeds than has been possible with previous structures. This is accomplished by combining, in one design, a slotted drive disc with a plurality of field creating coils.

Another object of the invention is the provision of a friction device of the type described which gives a better repeatable performance in that each time the unit is energized, the stopping time is consistent.

A further object of the invention is the provision of a unit which can be manufactured at reasonable cost.

A further object is the utilization of a means for moving the magnetic particles in such a way that they remain distributed and they flow to the point that none of them are retained in a heat pocket which will cause undue oxidization or destruction.

Other objects and features of the invention relating to details of construction and operation will be apparent in the following description and claims.

Drawings accompany the disclosure and the various views may be briefly described as:

FIGURE 1, a sectional view of the unit showing the various parts in detail.

FIGURE 2, a side elevation of a slinger bar.

FIGURE 3, an illustration of the slotted construction of the rotor.

Referring to the drawings:

A central housing unit 20 has bearing race assemblies 22 and 24 to support a rotating shaft 26 having a narrowed neck portion or shaft 28 operating in rotating seal units 30. The housing 20 has a reverse wall 32 with a radial portion 34 extending outwardly and serving as a support for an enclosing cylindrical wall 36 which forms, with the portion 32, an annular recess. At the end of the housing 20 and supported on the shaft 28 is a rotor element relatively movable to the housing 20 and which consists of a disc portion 38 and an integral flange portion 40. This disc portion is held in non-rotatable relation to the shaft 28 by an acircular opening fitted to the shaft, the disc being held in place by a washer 42 and a bolt 44 threaded into shaft 28.

The disc portion 38 is provided with four circular openings 48 to reduce the mass and also to permit flow of particles. Flange portion 40 is cut away as shown in FIGURE 3 to provide spaced axial openings 50 and L-shaped fingers having a short leg integral with disc portion 38 and a second long leg 52 extending axially into the annular recess. The openings 50 are recessed at 54 down into the wall of the disc a short distance to form the L-shaped fingers.

It has been found that, due to the effect of heat, centrifugal force, and internal strain in the metal, there may be a variable diameter on the tangs 52, and it is preferred that these be confined in substantially uniform radial position by a ring strip 56 which is brazed to the inner surfaces of the tangs 52 adjacent the ends. These tangs forming the flange 40 of the rotor are, in the embodiment shown, about 1¾″ in length and the slot openings 50 are dimensioned at about ¼″ to ⁵⁄₁₆″ to leave tangs or fingers about ⅜″ in width. The importance of this stability created by ring 56 will be appreciated in connection with the later described critical spacing relative to the magnetic field construction.

The shaft 26 is provided with a bore 58 to receive a shaft of a driving motor or other rotating element to be controlled. A set screw 60 can be used to lock the shaft in position.

Within the annular opening between the wall 32 and the cylindrical wall 36 are mounted three magnetic coils 62, 64 and 66, suitably housed in non-conductive casings 68 and spaced by iron rings 70 to provide three separate magnetic fields. The iron rings terminate on their inner diameter quite close to the flange 40 of the rotating element and the coils have lead wires 72 so that suitable power can be introduced at the will of an operator. The legs 52 have an axial length to extend the full span of the magnetic fields of coils 62, 64, 66 and lie radially very close to the coils.

An enclosing shell 80, having a snap flange 82, snaps over the cylindrical wall 36 to close the end of the unit and a charge of magnetic particle powder is included in the space formed by the annular chamber in which rotates the disc 38 and the slotted flange 40. Mounted at the end of the disc 38 is a slinger bar 84 shown in FIGURE 2 held in place by the bolt 44 against the washer 42. This slinger bar 84 is a sheet metal blade which extends outwardly into the area axially spaced from the coils 62. The sides 86 on the bar 84 taper toward the ends and are bent inwardly to a slight extent to produce a concavity on the inside of the blade. A tab 88 engages one of the holes to drive the slinger bar.

The above construction is preferably such that the gap between the outer surface of the tangs 52 forming the flange 40 and the inner diameter of the iron rings 70 is less than the .020″. The performance of the unit increases as this gap decreases and it has been found possible to decrease this gap to the point indicated by reason of the axial slots in the flange 40 which permits the magnetic powder to transfer and flow in rough simulation to a pumping action so that the powder moves in and out of the heat areas in a relatively continuous flow. The coils 62, 64 and 66 have a relatively square configuration to minimize coil leakage. The fingers 40 also underlie the entire magnetic field area of the three magnetic coils and accordingly expose a large area to the magnetic fields and to the magnetic particles which will distribute through the area because of the slotted openings and narrow clearance gap described. Multiple fields are an important feature of this invention and the preferred minimum number of fields is three as shown in the drawings.

It will be recognized that particles are used which are preferably under 100 microns in diameter and that these particles are moved in part by the air which is flowing as a result of the rotating of the rotor. This flow of particles tends to prevent any packing in any corners and thus prevents any off-center problems which might cause undue vibration. In addition, the multiple magnetic fields set up by the plurality of coils tends to prevent the concentration of the magnetic powder at any particular point when current is introduced into the coils.

By keeping the powder distributed, it tends to flow better in and out of the magnetic field areas and thus distributes itself so that there are no starved areas and no areas where the powder tends to stagnate or pack. A powder which can be utilized in the structure above described as an example has a composition as follows:

(1) Eighty percent (80%) by weight type 410 stainless steel powder.
(2) Twenty percent (20%) by weight carbonyl L iron powder suitably processed to resist oxidation.

It will thus be seen that there has been provided an improved structure utilizing multiple field creating means in close radial proximity to a relatively long slotted flange of a rotor with a powder area confined around the flange to insure intimate association while insuring a flow to avoid packing and heating.

I claim:

1. A coupling device for controlling the transmission of force between two relatively movable members comprising:
(a) a first housing member having a radially extending face wall terminating in an axially extending wall having a radial flange at its outer end,
(b) a cylindrical outer wall sealed on said radially extending flange to form an annular opening,
(c) a frictionally-engaged cover means peripherally engaged with said cylindrical outer wall overlying the radial face wall of said first member and said annular recess,
(d) a second member movable relative to said first member comprising a disc overlying said radially extending face wall of said first member having spaced axially extending fingers projecting into said annular opening,
(e) means forming a plurality of electromagnetic fields within said annular opening radially adjacent said fingers, and
(f) a charge of powdered magnetic material enclosed by said first member and said cover member to lie in the area of rotation of said fingers.

2. A coupling device for controlling the transmission of force between two relatively movable members comprising:
(a) a first member forming a housing having an annular opening with an inner and outer wall,
(b) a plurality of closely spaced, electromagnetic, annular field-creating coils confined annularly against one wall of said opening,
(c) a second member movable relative to said first member comprising a disc concentric with said annular opening having a flange provided with axial slots to form L-shaped fingers, one leg of each extending axially into said annular opening between said coils and the other wall of said opening end lying radially closely adjacent said coils throughout the axial extent thereof,
(d) a charge of dry magnetic particles within said housing adaptable to be centrifugally distributed around said axially extending legs of said second member,
(e) said field-creating coils comprising a plurality of relatively thin annular windings encased in non-magnetic material and each having a ring of magnetic material positioned axially on each side thereof, said rings extending from a position against the outer wall of said annular opening to a position closely adjacent the outer surfaces of said axially extending legs of said flange, said legs extending the axial extent of said coil construction to lie within the magnetic fields created by said coils and said rings when energized,
(f) said annular opening and said second member being enclosed by a convex cover member frictionally engaged with said first member at the periphery thereof on the outer wall of said annular opening.

3. A coupling device for controlling the transmission of force between two relatively movable members comprising:
(a) a first member forming a housing having an annular opening with an inner and outer wall,
(b) a plurality of closely spaced, electromagnetic, annular field-creating coils confined annularly against one wall of said opening,
(c) a second member movable relative to said first member comprising a disc concentric with said annular opening having a flange provided with axial slots to form L-shaped fingers, one leg of each extending axially into said annular opening between said coils and the other wall of said opening end lying radially closely adjacent said coils throughout the axial extent thereof,
(d) a charge of dry magnetic particles within said housing adaptable to be centrifugally distributed around said axially extending legs of said second member, and
(e) a stabilizing ring fastened to each of the axially extending legs of said second member adjacent the ends thereof to maintain said legs at a constant radius.

4. A coupling device for controlling the transmission of force between two relatively movable members comprising:
(a) a first member forming a housing having an annular opening with an inner and outer wall,
(b) a plurality of at least three closely spaced, electromagnetic, annular field-creating coils disposed adjacent one wall of said opening,
(c) a second member movable relative to said first member comprising a disc concentric with said annular opening having a flange provided with axial slots to form axially extending fingers, one leg of each extending axially into said annular opening between said coils and the other wall of said opening end lying radially closely adjacent said coils throughout the axial extent thereof,
(d) a charge of dry magnetic particles within said housing adaptable to be centrifugally distributed around said axially extending fingers of said second member, and
(e) a stabilizing ring fastened to each of the axially extending fingers of said second member adjacent the ends thereof to maintain said fingers at a constant radius.

References Cited by the Examiner

UNITED STATES PATENTS

| | | | |
|---|---|---|---|
| 2,772,761 | 12/1956 | Janson | 192—21.5 |
| 2,794,525 | 6/1957 | Winther | 192—21.5 |
| 2,822,070 | 2/1958 | Jaeschke | 192—21.5 |
| 2,948,371 | 8/1960 | Lehde | 192—21.5 |

DAVID J. WILLIAMOWSKY, *Primary Examiner.*